United States Patent [19]
Schindler et al.

[11] 4,083,906
[45] Apr. 11, 1978

[54] PROCESS FOR THE MANUFACTURE OF OPEN-PORE SHAPED ARTICLES OF POLYVINYL ALCOHOL-ACETAL SPONGE

[75] Inventors: Hermann Schindler, Fischbach, Taunus; Wolfgang Zimmermann, Frankfurt am Main, both of Germany

[73] Assignee: Hoechst Aktiengesellschaft, Frankfurt am Main, Germany

[21] Appl. No.: 555,560

[22] Filed: Mar. 5, 1975

[30] Foreign Application Priority Data

Mar. 7, 1974 Germany ............................ 2410848

[51] Int. Cl.² ............................................. B29D 27/04
[52] U.S. Cl. .................................... 264/49; 260/2.5 M
[58] Field of Search ................. 264/41, 49; 260/2.5 M

[56] References Cited

U.S. PATENT DOCUMENTS

| 2,609,347 | 9/1952 | Wilson | 264/48 X |
| 2,668,153 | /1953 | Hammon | 260/73 L X |
| 2,825,747 | 3/1958 | Rogers | 260/2.5 R X |
| 3,276,996 | 10/1966 | Lazare | 264/49 X |
| 3,663,470 | 5/1972 | Nishimura et al. | 264/41 X |

FOREIGN PATENT DOCUMENTS 2,359,170  6/1975  Germany ............................ 264/49

OTHER PUBLICATIONS

"Molecular Weight Relations of Poly(ethylene Oxide)", by Bailey, F. E.; J. L. Kucera; and L. G. Imhof, in Journal of Polymer Science, Letters to the Editors, vol. XXXII, issue No. 125 (1958), pp. 517 and 518.
Scholtan, von W. "Molekulargewichtshestimmung von Polyacrylamid Mittels der Ultrazentrifuge", in Makromolekulare Chemie. vol. 14 (1954), pp. 169–178.
Bernhardt, Ernest C., Edt. "Processing of Themoplastic Materials", New York, Reinhold, c1959, p. 600.

*Primary Examiner*—Philip Anderson
*Attorney, Agent, or Firm*—Curtis, Morris & Safford

[57] ABSTRACT

Starch products which were hitherto used as pore-forming substances in the manufacture of polyvinyl alcohol acetal sponges are replaced by polyethylene glycol or polyacrylamide. This results in a more uniform distribution of pore size, lower shrinkage of the sponge material during the acetalization, and easier washing of the sponge after the acetalization.

3 Claims, No Drawings

PROCESS FOR THE MANUFACTURE OF OPEN-PORE SHAPED ARTICLES OF POLYVINYL ALCOHOL-ACETAL SPONGE

The invention is related to a process for the manufacture of open-pore, shaped articles of polyvinyl alcohol acetal sponge by acetalization of polyvinyl alcohol in aqueous solution, in the presence of a water-soluble, pore-forming substance.

Open-pore shaped articles of polyvinyl alcohol acetal sponge are usually prepared according to two different processes, namely:
(1) Foaming process with air or with other gases and
(2) Molding process.

The first process consists in submitting a foam prepared of a polyvinyl alcohol solution to acetalization with an aldehyde in the presence of mineral acid, and subsequently washing the excess acid and aldehyde out of the foam rendered water-insoluble. In this manner relatively coarse-pore sponges are obtained, the pore size of which is difficult to control.

The second process provides for the preparation of mixture or emulsion as homogeneous as possible and free of foam, or an emulsion of a polyvinyl alcohol solution and of a solution of a water-soluble, usually polymeric component which can be acetalized only with difficulty or not at all and, while the polyvinyl alcohol portion is acetalized with an aldehyde in the presence of a mineral acid. In the washing operation, which is required for both above processes, the second substance which is not acetalized and which is still water-soluble is washed out together with the excess of aldehyde and acid; what remains is a polyvinyl alcohol acetal sponge having most often very fine pores. As inert water-soluble components preferably decomposed or partially acetalized starches are known.

This second process for the manufacture of polyvinyl alcohol acetal sponges also has considerable disadvantages.

Thus, for example, the control of the size of the pores is difficult and long washing periods are required. The moist polyvinyl alcohol sponges obtained are often flabby and have no resilience. The shrinkage of the mixture occurring during the very long reaction period of about 48 hours at temperatures of about 30° C is relatively high so that it is not easy to produce sponges true to size in prefabricated molds; besides, the entire surface of the final sponge is completely covered with a film of cross-linked polyvinyl alcohol which makes the washing process take even longer. A separate processing step is required for peeling this film off the sponge body.

Now, a process has been found for the manufacture of open-pore shaped articles of polyvinyl alcohol acetal sponge by means of acid-catalyzed acetalization of the polyvinyl alcohol in a mixture or in an emulsion of aqueous solutions of the polyvinyl alcohol and of a pore-forming substance which is practically inert to acetalization and which is washed out after completion of the reaction, in which process the inert substance is polyethylene glycol or polyacrylamide.

This acetalization is preferably carried out with formaldehyde or with aliphatic dialdehydes. As polyvinyl alcohols are used the polymer saponification or hydrolysis products of polyvinyl esters, especially polyvinyl acetate, which may still contain ester groups and which have an ester number of up to 400 mg of KOH/g.

Among the pore-forming substances to be used according to the invention the polyethylene glycol has a molecular weight ranging from 1,000 – 100,000, preferably from 10,000 – 50,000, and the polyacrylamide has a molecular weight ranging from 10,000 – 200,000, preferably from 50,000 – 100,000. Preference is given to the use of branched-chain polyacrylamides. The pore-forming substances are used in quantities of from 10 – 50 weight %, calculated on polyvinyl alcohol, (both as solids). In spite of their different chemical nature, polyethylene glycol and polyacrylamide offer practically the same advantages when used for the manufacture of polyvinyl alcohols sponge, as compared to known processes. Some polymer chains of polyethylene glycol or of polyacrylamide as well are chemically bonded to the polyvinyl alcohol chain by means of acetal bridges in the presence of an aldehyde preferably of formaldehyde, and these bridges surprisingly improve even more the already good absorbing properties and the resilience of the final polyvinyl alcohol sponge.

A further advantage of the process according to the invention as compared to the known starch/polyvinyl alcohol sponge-molding process is the shorter reaction time, due to the fact that the operation may be carried out at higher temperatures, this fact being also responsible for a desirable diminution of the required excess of formaldehyde and acid so that the waste water pollution is reduced. The reaction temperature can be increased to about 90° C, the usual reaction time thus being cut by the factor 8 approximately.

Variations of the concentration and of the mixing proportions of the solutions of polyvinyl alcohol and of polyethylene glycol or polyacrylamide allow for a control of the pore size within a range of from 2.0 mm to 0.02 mm of diameter. Calculated on solids, the proportions of polyvinyl alcohol to polyethylene glycol or polyacrylamide can vary from 1:0.1 to 1:0.5. The larger the proportion, the finer are the pores of the sponge. In order to obtain a homogeneous mixture, it is advantageous to use also emulsifying agents for larger quantities of pore-forming agents.

An additional means of controlling the pore size is the concentration or the contents of water of the total molding solution, provided that the ratio of polyvinyl alcohol to pore forming agent is constant. The pore size of the sponge obtained may also be influenced by means of the molecular weight of the polyethylene glycol or of the polyacrylamide to be used. An increased molecular weight of the inert additive results in an increased pore size of the sponge; for example, at comparable conditions a polyethylene glycol having the molecular weight of about 35,000 yields a sponge having an average pore size of about 1 – 2 mm; a polyethylene glycol having a molecular weight of about 20,000 yields a sponge having an average pore size of about 0.5 – 1 mm, whilst a polyethylene glycol having a molecular weight of about 10,000 results in a sponge having an average pore size of about 0.1 – 0.5 mm.

The reason why the pore size depends on the molecular weight of the inert additive is obviously that the compatibility of polyvinyl alcohol solution and the polyethylene glycol or polyacrylamide solution decreases as the molecular weight of the two latter compounds increases.

As compared to the use of starch or derivatives of starch as inert additive the process according to the invention offers the additional advantage that the excess of polyethylene glycol or polyacrylamide may be washed out of the final sponge in a considerably shorter period. A further essential advantage of the process according to the invention is also the surprising fact that the moist sponge body is not covered by an uninterrupted film of acetalized polyvinyl alcohol. This additional advantage saves the postpeeling of the sponge and also permits the washing process to be cut to a minimun.

Finally, the process according to the invention offers the advantage as compared to the processes according to the state of the art that the still moist sponges which are prepared with polyethylene glycol or with polyacrylamide show a particularly high resilience, regardless or pore size and molecular weight of the polyvinyl alcohol used.

The shrinkage of the mixture during the acetalisation of polyvinyl alcohol is practically negligible so that at the end of the washing process the result obtained is a polyvinyl alcohol sponge substantially the same size as to the mold.

The following examples illustrate the invention:

EXAMPLE 1

2,400 parts by weight of an aqueous solution (at 20 weight %) of a polyvinyl alcohol, the viscosity of which — measured at 4% in water — is 18 cP and the ester number of which is 140, were mixed with 650 parts by weight of an aqueous formaldehyde solution (at 30 weight %).

The homogeneous mixture was allowed to stand until air bubbles formed during the agitation had escaped. 3,500 parts by weight of an aqueous solution (at 4%) of polyethylene glycol having an average molecular weight of about 35,000 were added to this solution while agitating it, but strictly avoiding any introduction of air.

After completion of the homogenizing operation 1,700 parts by weight of sulfuric acid (at about 60 weight %) were introduced into the mixture as acetalisation catalyst. The mixture was stirred for 20 minutes without introducing air and then poured into an acid-proof reaction vessel of polyethylene, wherein the reaction was carried out in a 12 hours period approximately, at about 40° C.

The more the degree of acetalization of polyvinyl alcohol increased, the more droplets of polyethylene glycol solution precipitated within the reaction mixture, these droplets forming the pores of the sponge in the course of the subsequent washing process. Upon completion of the reaction, the sponge obtained was washed with water until free of acid. The resulting sponge body was not covered by a film of acetalized polyvinyl alcohol more or less impermeable to water as is the case with sponges which are prepared by means of solutions of starch or derivatives of starch instead of polyethylene glycol. The polyvinyl alcohol sponge obtained in this way had an average pore diameter of 1 – 2 mm and a water absorption capacity — calculated on the dry sponge — of 1,000 weight %. It contained 1.5 weight % of incorporated polyethylene glycol groups.

EXAMPLE 2

In the same way as described by example 1 a homogeneous mixture free of air bubbles was prepared of 2,400 parts by weight of the same polyvinyl alcohol solution as described in example 1, 650 parts by weight of an aqueous formaldehyde solution (at 30 weight%), 3,500 parts by weight of an aqueous solution (at 4%) of polyethylene glycol with an average molecular weight of about 20,000, and of 1,700 parts by weight of sulfuric acid (at about 60 weight %).

This mixture was processed as in example 1. A polyvinyl alcohol sponge was obtained having the following properties:

Average pore diameter from 0.5 to 1 mm, water absorption capacity of the dry sponge 1,200 weight %, polyethylene glycol group content 1.7 weight %.

EXAMPLE 3

A homogeneous mixture free of air bubbles was prepared in the same way as described in example 1 of the following liquid components:

2,400 parts by weight of the same polyvinyl alcohol solution as per example 1, 650 parts by weight of an aqueous formaldehyde solution (at 30 weight %), 3,500 parts by weight of an aqueous solution of polyethylene glycol (at 4%) having an average molecular weight of about 10,000, 1,700 parts by weight of sulfuric acid (at about 60 weight %).

This mixture was worked up as per example 1.

The polyvinyl alcohol sponge obtained had the following properties:

Average pore diameter from 0.1 to 0.5 mm; water absorption capacity of the dry sponge 1,100 weight %; incorporated polyethylene glycol groups 2.0 weight %.

The examples 1 – 3 show that a decreasing molecular weight of the polyethylene glycol used means also that the average pore diameter of the polyvinyl alcohol sponge decreases.

EXAMPLE 4

The same operation was carried out as in example 2, except that a polyethylene glycol solution of a higher concentration was used at the same weight ratio of polyvinyl alcohol to polyethylene glycol.

The following liquid components were blended:

2,400 parts by weight of the same polyvinyl alcohol solution as described by example 1, 650 parts by weight of an aqueous formaldehyde solution (at 30 weight %), 2,640 parts by weight of an aqueous polyethylene glycol solution (at 5.3%) having an average molecular weight of about 20,000, 1,700 parts by weight of sulfuric acid (at about 60 weight %).

Reaction and work-up of this mixture were carried out according to example 1.

The polyvinyl alcohol sponge obtained had the following properties:

Average pore diameter from 0.05 to 0.2 mm; water absorption capacity of the dry sponge 800 weight %; incorporated polyethylene glycol groups 1.8 weight %.

Due to the higher concentration of the polyethylene glycol solution used the average pore diameter and the water absorption capacity of the sponge were inferior to the corresponding values of example 2.

The following examples 5 and 6 use polyacrylamide as pore-forming substance.

EXAMPLE 5

650 parts by weight of an aqueous formaldehyde solution (at 30 weight %) were introduced while stirring into 2,400 parts by weight of the same polyvinyl alcohol solution as described by example 1. The homogeneous mixture was acidified by means of 1,700 parts by weight of sulfuric acid (at about 60%) after having added 3,500 parts by weight of an aqueous solution (at 4%) of a branched polyacrylamide having an average molecular weight of about 80,000.

This mixture was reacted and worked-up according to example 1. The moist sponge body was also free of any superficial film so that the washing-out process was easy.

The obtained polyvinyl alcohol sponge had the following properties:

Average pore diameter from 0.05 to 1.0 mm; water absorption capacity of the dry sponge 1,100 weight %; polyacrylamide groups contained: 11.0 weight %.

EXAMPLE 6

In the same way as described in Example 1 there were blended:

2,400 parts by weight of the same polyvinyl alcohol solution according to example 1, 650 parts by weight of an aqueous formaldehyde solution (at 30 weight %), 3,500 parts by weight of an aqueous solution (at 5%) of a branched polyacrylamide having an average molecular weight of about 80,000, 3,300 parts by weight of water and 1,700 parts by weight of sulfuric acid (at about 60 %).

This mixture was reacted and worked-up according to example 1.

The obtained polyvinyl alcohol sponge had the following properties:

Average pore diameter from 0.1 to 2.0 mm; water absorption capacity of the dry sponge 1,300 weight %; incorporated polyacrylamide groups 13.0 weight %.

What is claimed is:

1. In a process for the manufacture of open-pore, shaped articles of polyvinyl alcohol acetal sponge by acid catalyzed acetalization of polyvinyl alcohol in a mixture or emulsion of aqueous solutions of polyvinyl alcohol and a pore-forming substance substantially inert to acetalization, said acetalization being carried out in a mold to produce a shaped article and said shaped article being substantially washed with water to develop its porosity, the improvement which comprises using from 10% to 50% by weight, based on the weight of said polyvinyl alcohol, of a pore-forming substance selected from the group consisting of water-soluble polyethylene glycol and water-soluble polyacrylamide.

2. A process according to claim 1 wherein the pore-forming substance is selected from polyethylene glycol having an average molecular weight of 1,000 to 100,000 and polyacrylamide having an average molecular weight of 10,000 to 200,000.

3. A process according to claim 1 wherein the pore-forming substance is selected from polyethylene glycol having an average molecular weight of 10,000 to 50,000 and polyacrylamide having an average molecular weight of 50,000 to 100,000.

* * * * *